US011236805B2

(12) United States Patent
Kim (10) Patent No.: US 11,236,805 B2
(45) Date of Patent: Feb. 1, 2022

(54) PLANETARY GEAR APPARATUS

(71) Applicant: Hyundai Transys Inc., Hwaseong-si (KR)

(72) Inventor: Tae Hoon Kim, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 0 days.

(21) Appl. No.: 17/077,544

(22) Filed: Oct. 22, 2020

(65) Prior Publication Data

US 2021/0123508 A1    Apr. 29, 2021

(30) Foreign Application Priority Data

Oct. 25, 2019   (KR) ........................ 10-2019-0133821

(51) Int. Cl.
*F16H 3/46*   (2006.01)
*F16H 57/04*  (2010.01)

(52) U.S. Cl.
CPC ............. *F16H 3/46* (2013.01); *F16H 57/043* (2013.01); *F16H 57/0484* (2013.01); *F16H 2200/2007* (2013.01)

(58) Field of Classification Search
CPC .................................. F16H 3/58; F16H 3/663
See application file for complete search history.

(56) References Cited

U.S. PATENT DOCUMENTS 2,931,252 A * 4/1960 Ferguson .................. F16H 3/58
                                                        475/338

FOREIGN PATENT DOCUMENTS

| JP | 2844039 B2 * | 1/1999 | ......... F16H 57/0479 |
| KR | 10-2009-0049312 A | 5/2009 | |
| KR | 10-1905985 B1 | 10/2018 | |

OTHER PUBLICATIONS

Office Action dated Dec. 11, 2020 in Korean Application No. 10-2019-0133821.

* cited by examiner

*Primary Examiner* — Derek D Knight
(74) *Attorney, Agent, or Firm* — Saliwanchik, Lloyd & Eisenschenk (57) ABSTRACT

A planetary gear apparatus includes single pinion gears, double pinion gears comprising first double pinion gears and second double pinion gears, a planet carrier unit surrounding the single pinion gears, the first double pinion gears, and the second double pinion gears, first pinion shafts coupled to the planet carrier unit, the single pinion gears being rotatably mounted on the first pinion shafts, and one of the first double pinion gears and the second double pinion gears being rotatably mounted on the first pinion shafts, and second pinion shafts coupled to the planet carrier unit, wherein the other of the first double pinion gears and the second double pinion gears are mounted on the second pinion shafts.

12 Claims, 9 Drawing Sheets

PLANETARY GEAR APPARATUS

CROSS-REFERENCE TO RELATED APPLICATION

This application claims priority from and the benefit of Korean Patent Application No. 10-2019-0133821, filed on Oct. 25, 2019, which is hereby incorporated by reference for all purposes as if set forth herein.

BACKGROUND

Field

Exemplary embodiments of the present disclosure relate to a planetary gear apparatus, and more particularly, to a planetary gear apparatus having a structure able to reduce the number of components to reduce component costs, increase the capacity of torque, and reduce noise.

Discussion of the Background

In general, a planetary gear apparatus includes a sun gear, a ring gear, pinion gears, and a planet carrier. The pinion gears engaged with the sun gear and the ring gear are connected to the planet carrier.

The planetary gear apparatus is divided into a single pinion planetary gear assembly and a double pinion planetary gear assembly. The single pinion planetary gear assembly is an assembly in which a single type of pinion gears are coupled to a sun gear and a ring gear, the pinion gears including single pinion gears, whereas the double pinion planetary gear assembly is an assembly in which two types of pinion gears are coupled to a sun gear and a ring gear, the pinion gears including double outer pinion gears and double inner pinion gears.

The planet carrier includes a plurality of carriers. A shaft hole is machined in each of the plurality of carriers, a pinion shaft is fixed to the interior of the shaft hole, and a pinion gear is disposed on the pinion shaft. Here, in a common carrier from among the plurality of carriers, double pinion shafts on which double outer pinion gears and double inner pinion gears are disposed and single pinion shafts on which single pinion gears are disposed are used in common. The pinion shafts must be disposed by forming shaft holes in the common carrier by the number of the double pinion shafts and the single pinion shafts. When three single pinion gears, three double inner pinion gears, and three double outer pinion gears are disposed on the plurality of carriers, nine shaft holes must be formed in the common carrier, and nine pinion shafts are necessary.

Since the pinion shafts must be disposed by forming the shaft holes in the common carrier by the number of the double pinion shafts and the single pinion shafts as described above, there is a problem in that the number of components and component costs may be increased. In addition, a planetary gear assembly must have four or more pinion gears disposed therein in order to form a reliable support structure and reduce noise. However, it is difficult to form three or more shaft holes, and thus, it is impossible to increase the number of pinion gears. Thus, there is a problem in that the planetary gear assembly may be structurally unreliable. Therefore, there is a need to overcome this problem.

A background art of the present disclosure is disclosed in Korean Patent No. 10-1905985 (entitled "PLANETARY GEAR SET ASSEMBLY FOR AUTOMATIC TRANSMISSION," registered on Oct. 1, 2018).

SUMMARY

Various embodiments are directed to a planetary gear apparatus having a structure able to reduce the number of components is reduced to reduce component costs, increase the capacity of torque, and reduce noise.

In an embodiment, a planetary gear apparatus including: single pinion gears; double pinion gears including first double pinion gears and second double pinion gears; a planet carrier unit surrounding the single pinion gears, the first double pinion gears, and the second double pinion gears; first pinion shafts coupled to the planet carrier unit, the single pinion gears being rotatably mounted on the first pinion shafts, and one of the first double pinion gears and the second double pinion gears being rotatably mounted on the first pinion shafts; and second pinion shafts coupled to the planet carrier unit, wherein the other of the first double pinion gears and the second double pinion gears are mounted on the second pinion shafts.

The single pinion gears, one of the first double pinion gears and the second double pinion gears may be independently rotatable on the first pinion shafts.

The planet carrier unit may include: a first carrier surrounding the single pinion gears and including first shaft hole portions into which the first pinion shafts are inserted; a second carrier surrounding the first double pinion gears and the second double pinion gears and including second shaft hole portions into which the first pinion shafts are inserted and third shaft hole portions into which the second pinion shafts are inserted; and a third carrier disposed to face the second carrier and including fourth shaft hole portions into which the first pinion shafts are inserted and fifth shaft hole portions into which the second pinion shafts are inserted.

The first pinion shafts may include first oil hole portions and second oil hole portions, the first oil hole portions allowing oil to be supplied to the single pinion gears therethrough, and the second oil hole portions allowing the oil to be supplied to one of the first double pinion gears and the second double pinion gears therethrough.

The planetary gear apparatus may further include carrier pins coupling the first pinion shafts to the second carrier and the second pinion shafts to the second carrier.

The second carrier may include first carrier pin coupling hole portions formed in directions intersecting the second shaft hole portions, the carrier pins being coupled to the first carrier pin coupling hole portions. The first pinion shafts may have second carrier pin coupling hole portions facing the first carrier pin coupling hole portions, the carrier pins being coupled to the second carrier pin coupling hole portions.

The second carrier may have third carrier pin coupling hole portions formed in directions intersecting the third shaft hole portions, the carrier pins being coupled to the third carrier pin coupling hole portions. The second pinion shafts may have fourth carrier pin coupling hole portions facing the third carrier pin coupling hole portions, the carrier pins being coupled to the fourth carrier pin coupling hole portions.

In the planetary gear apparatus according to the present disclosure, the single pinion gears, the first double pinion gears, or the second double pinion gears are mounted on the first pinion shafts, respectively, so as to be rotatable independently of each other. Thus, the number of components may be reduced to reduce component costs, and the capacity of torque may be increased.

In addition, according to the present disclosure, the single pinion gears, the first double pinion gears, or the second double pinion gears are mounted on the first pinion shafts, respectively. Thus, the single pinion gears, the first double pinion gears, and the second double pinion gears may be additionally disposed on the carrier unit as required, thereby forming a reliable structure, by which the width of gear teeth may be reduced and noise may be reduced.

Furthermore, according to the present disclosure, the first oil hole portions, through which oil is supplied to the single pinion gears, and the second oil hole portions, through which oil is supplied to the first double pinion gears or the second double pinion gears, are formed in the first pinion shafts. Accordingly, lubrication ability may be improved.

DETAILED DESCRIPTION OF THE ILLUSTRATED EMBODIMENTS

Hereinafter, a planetary gear apparatus will be described below with reference to the accompanying drawings through various exemplary embodiments.

In the following description, the thicknesses of lines or the sizes of components illustrated in the drawings may be exaggerated for clarity and convenience of explanation. In addition, the terms used herein are defined in consideration of functions thereof in the present disclosure, but may vary depending on the intentions of users or operators, or practices. Therefore, the terms shall be defined on the basis of the description throughout the specification.

Figure 1:
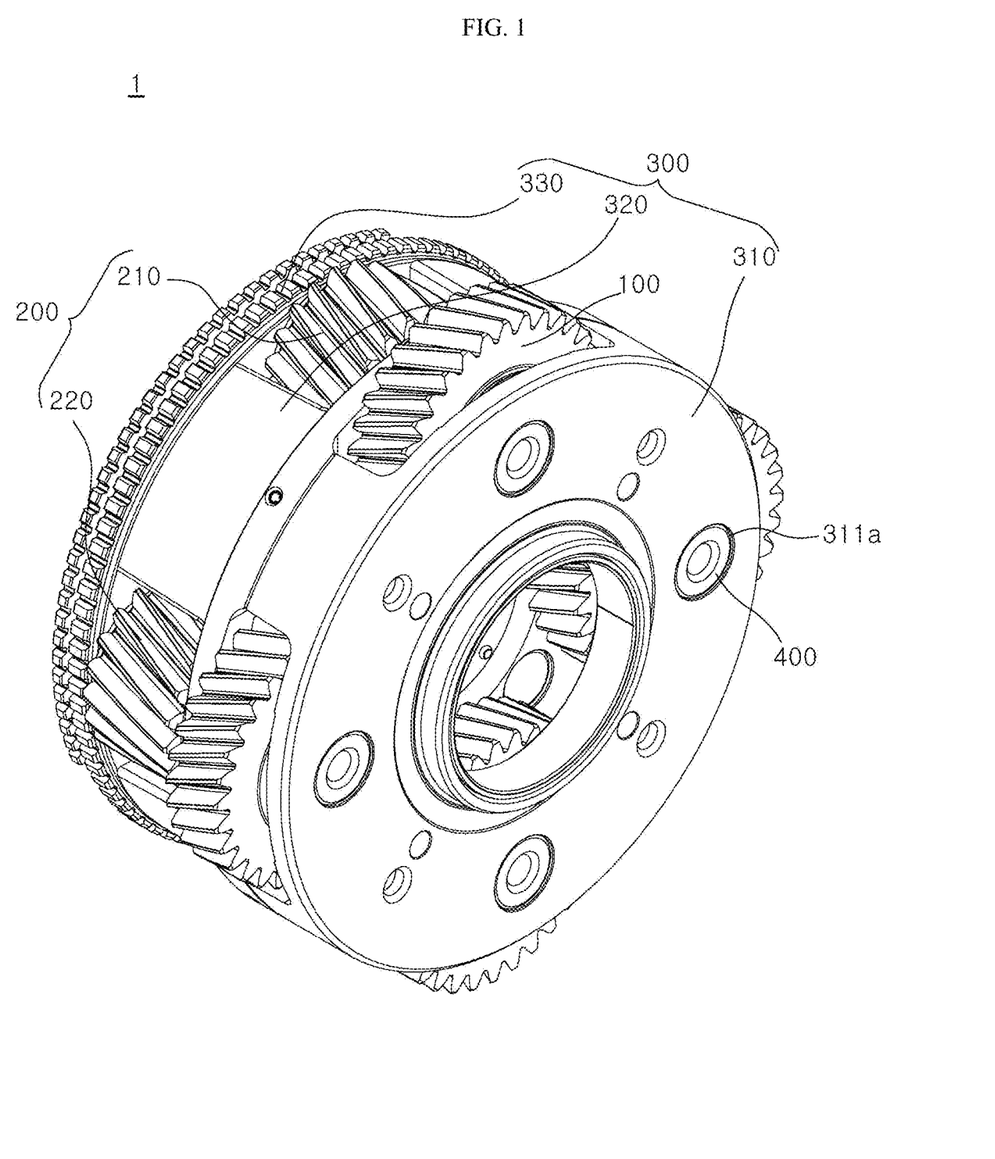
FIG. 1 is a perspective view schematically illustrating a planetary gear apparatus according to an embodiment of the present disclosure.
Figure 2:
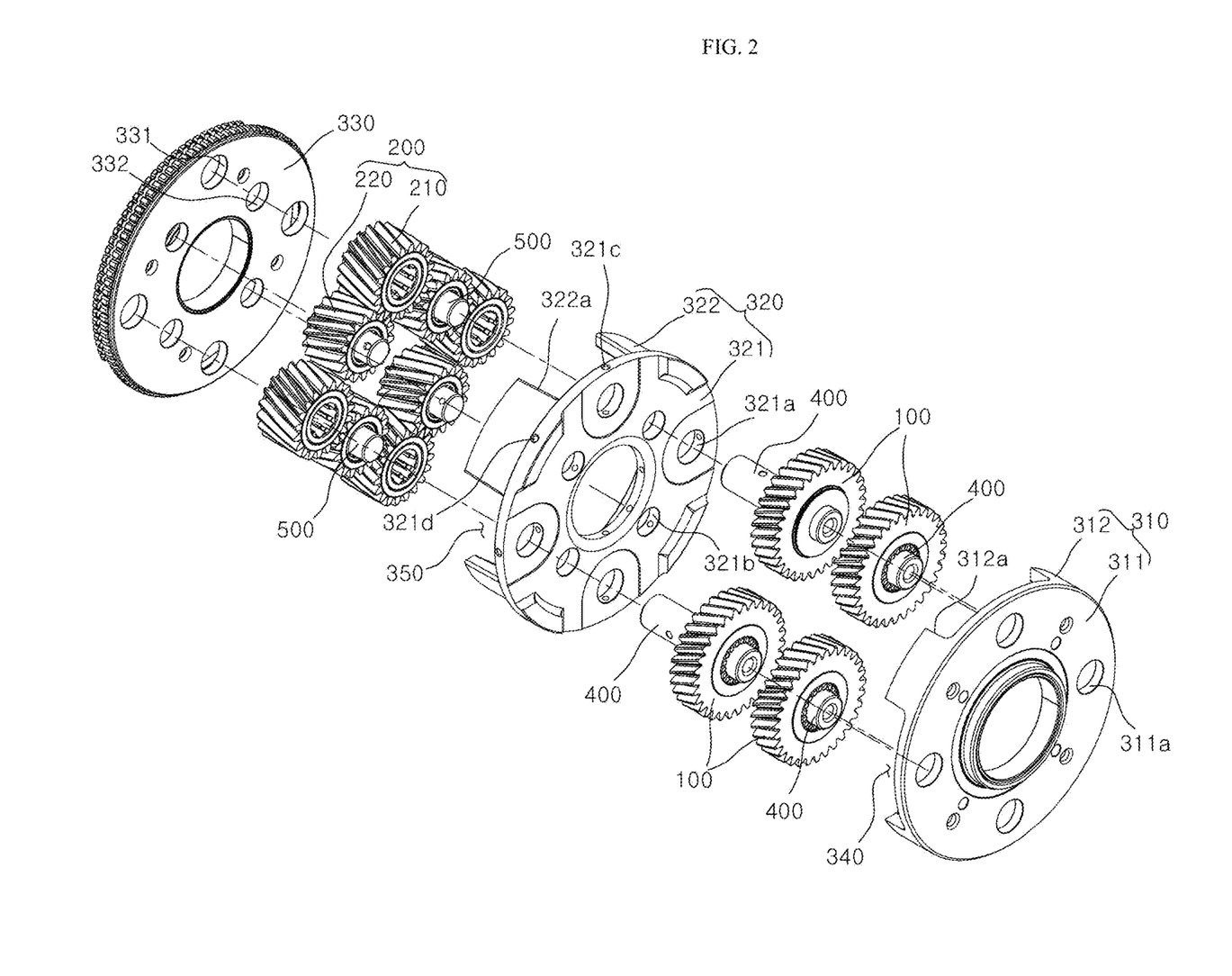
FIG. 2 is an exploded perspective view of the planetary gear apparatus according to the embodiment of the present disclosure.
Figure 3:
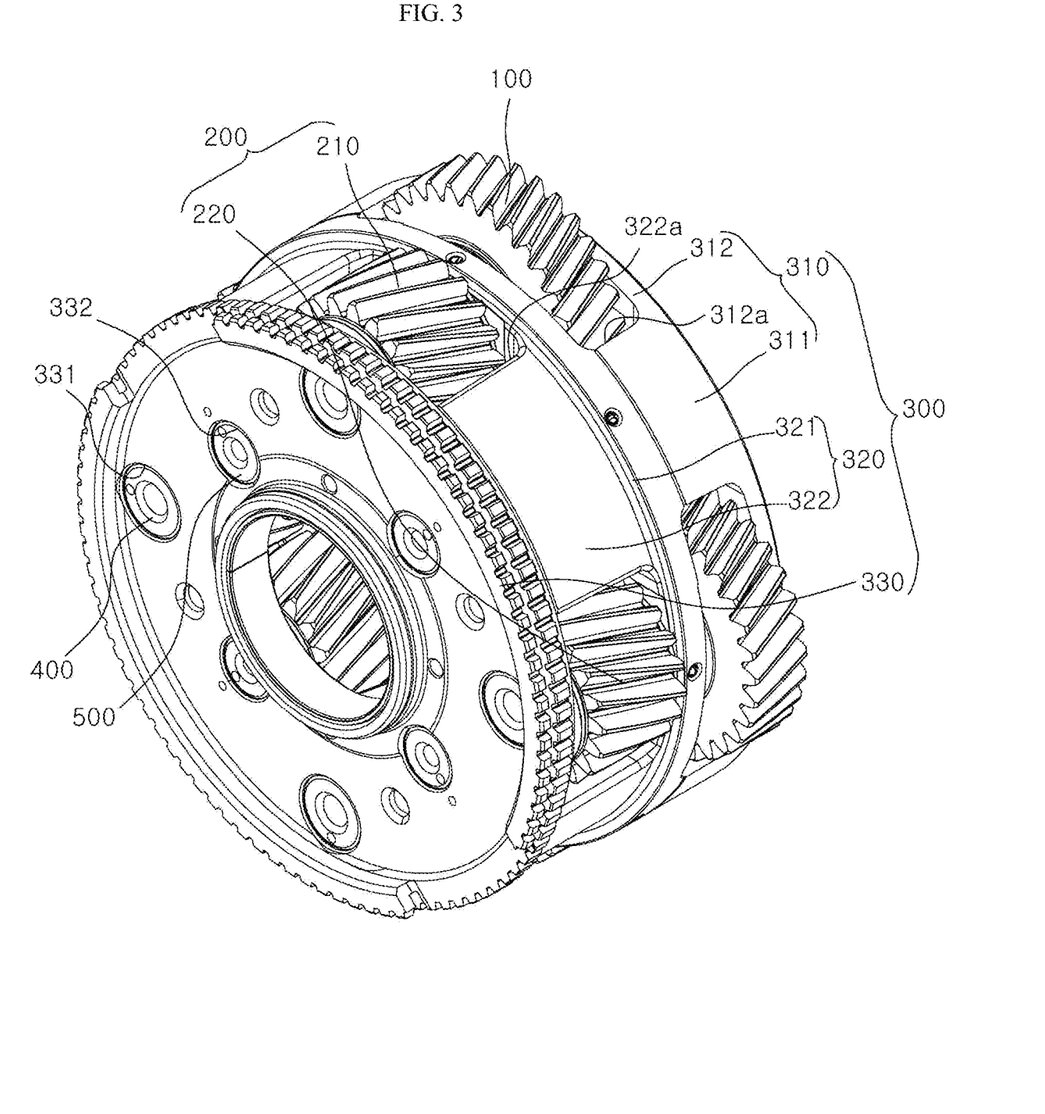
FIG. 3 is a perspective view of the planetary gear apparatus according to the embodiment of the present disclosure, viewed from a different direction.
Figure 4:
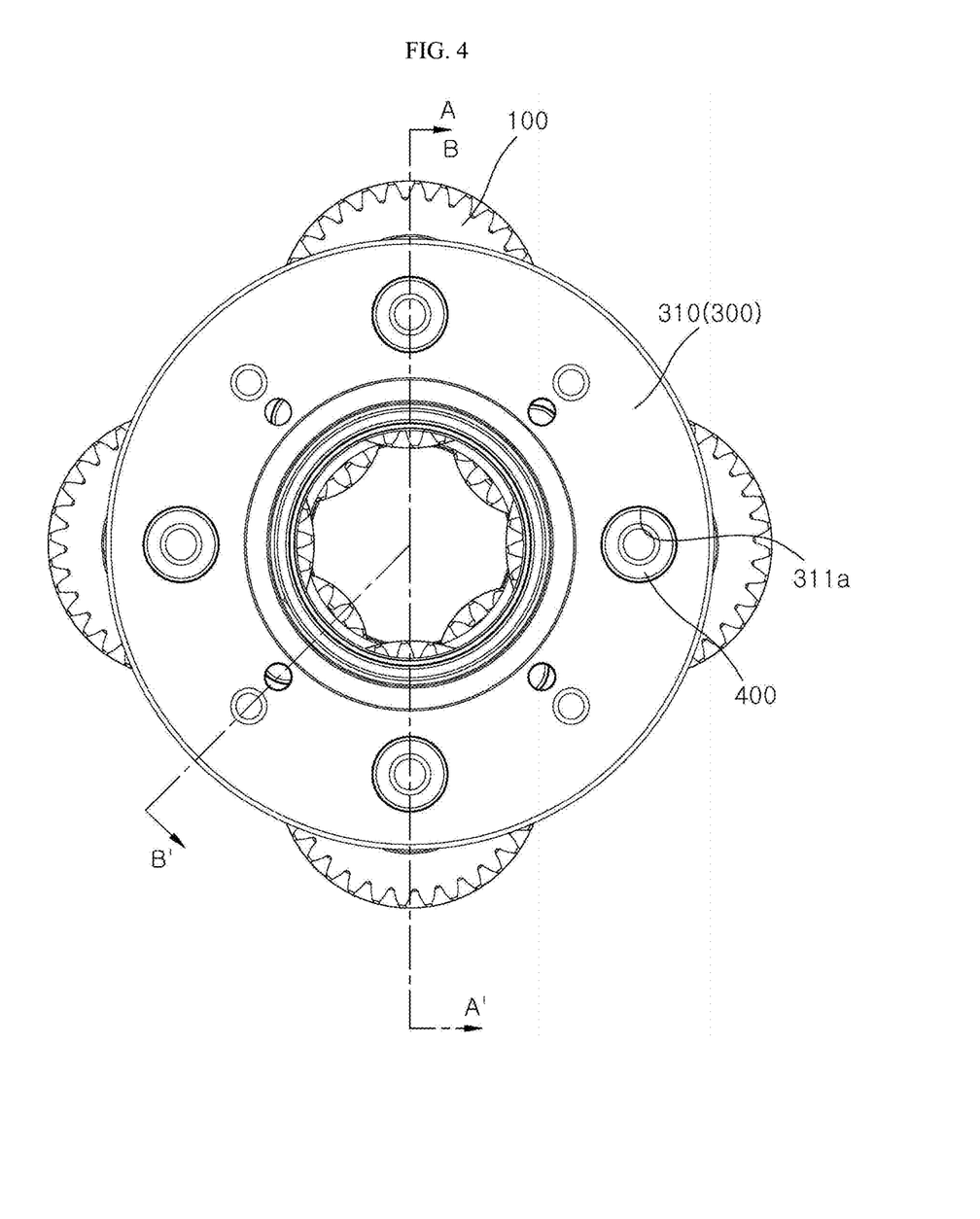
FIG. 4 is a front view of the planetary gear apparatus according to the embodiment of the present disclosure.
Figure 5:
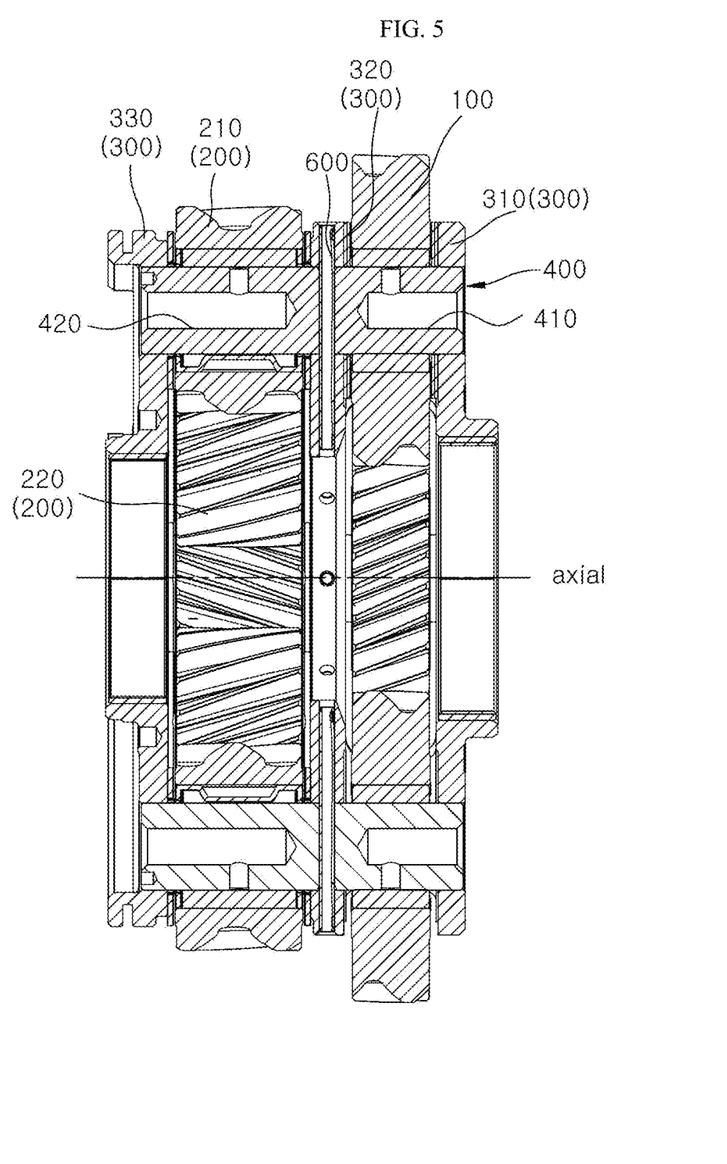
FIG. 5 is a cross-sectional view taken along the line A-A' in FIG. 4.
Figure 6:
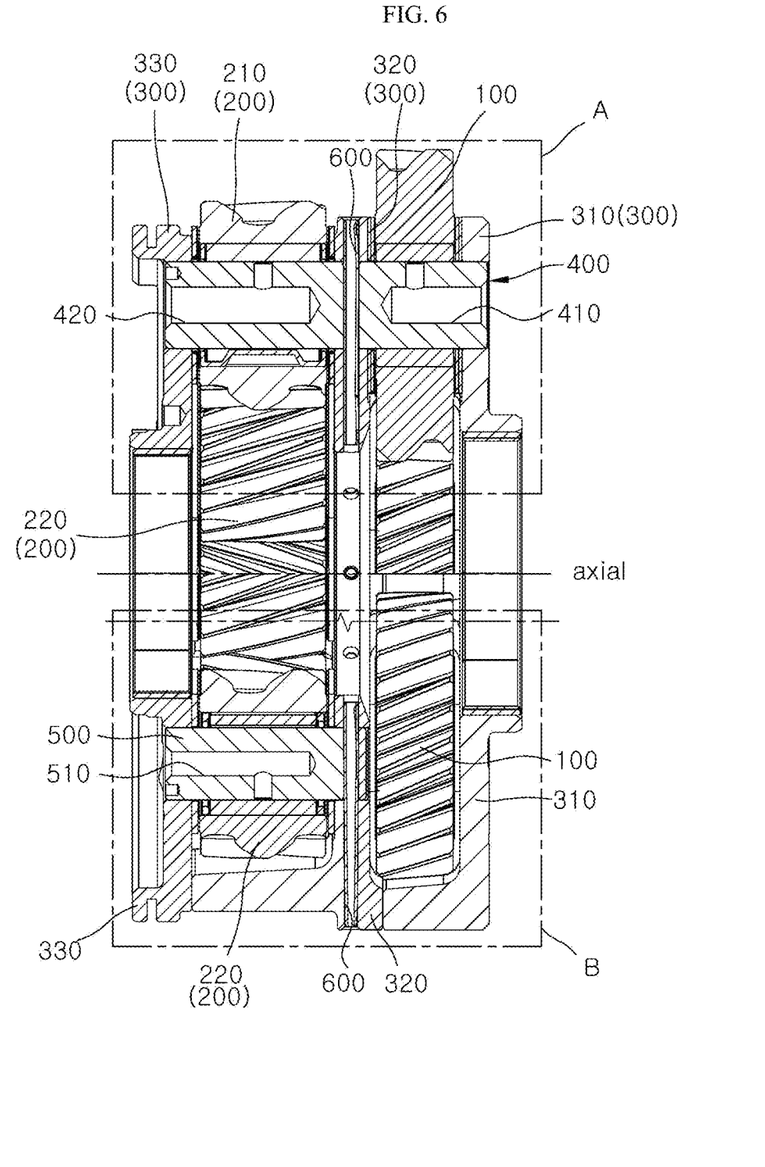
FIG. 6 is a cross-sectional view taken along the line B-B' in FIG. 4.
Figure 7:
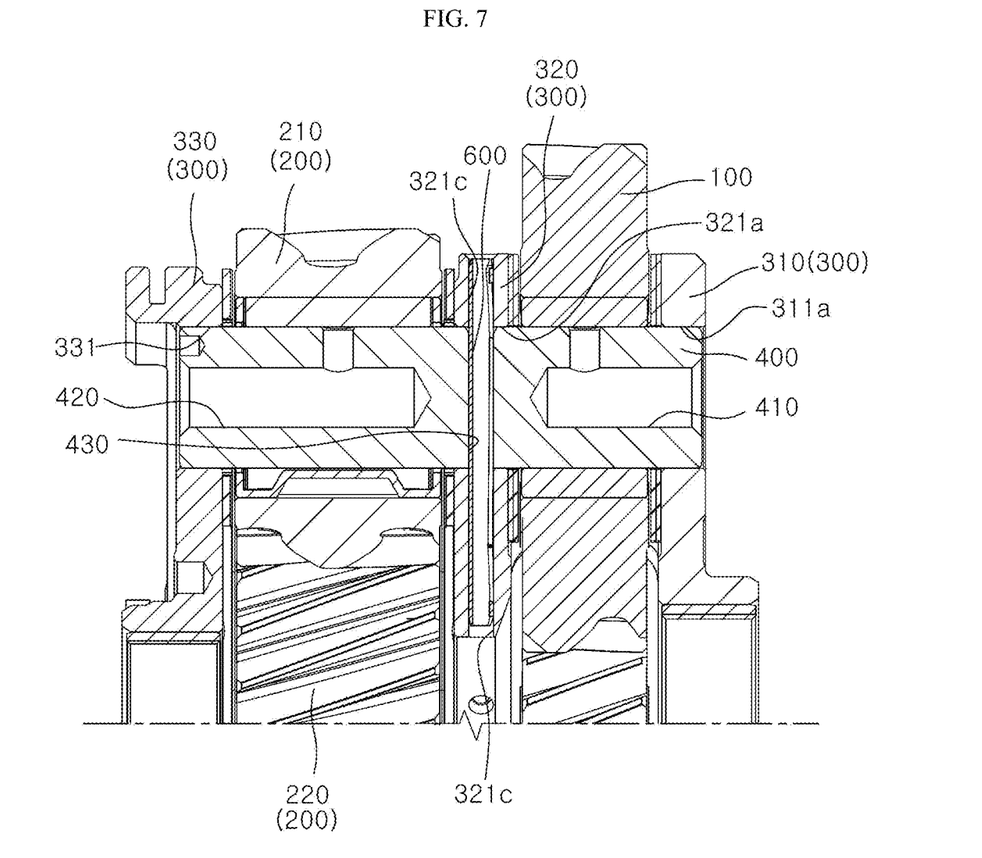
FIG. 7 is an enlarged view of the portion A in FIG. 6.
Figure 8:
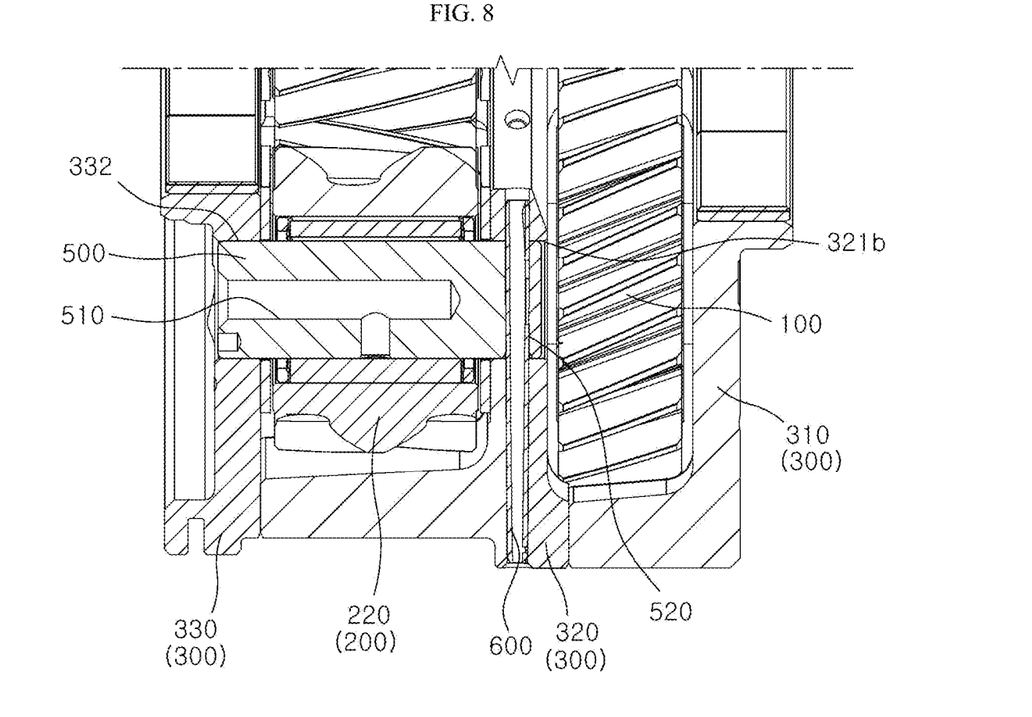
FIG. 8 is an enlarged view of the portion B in FIG. 6.
Figure 9:
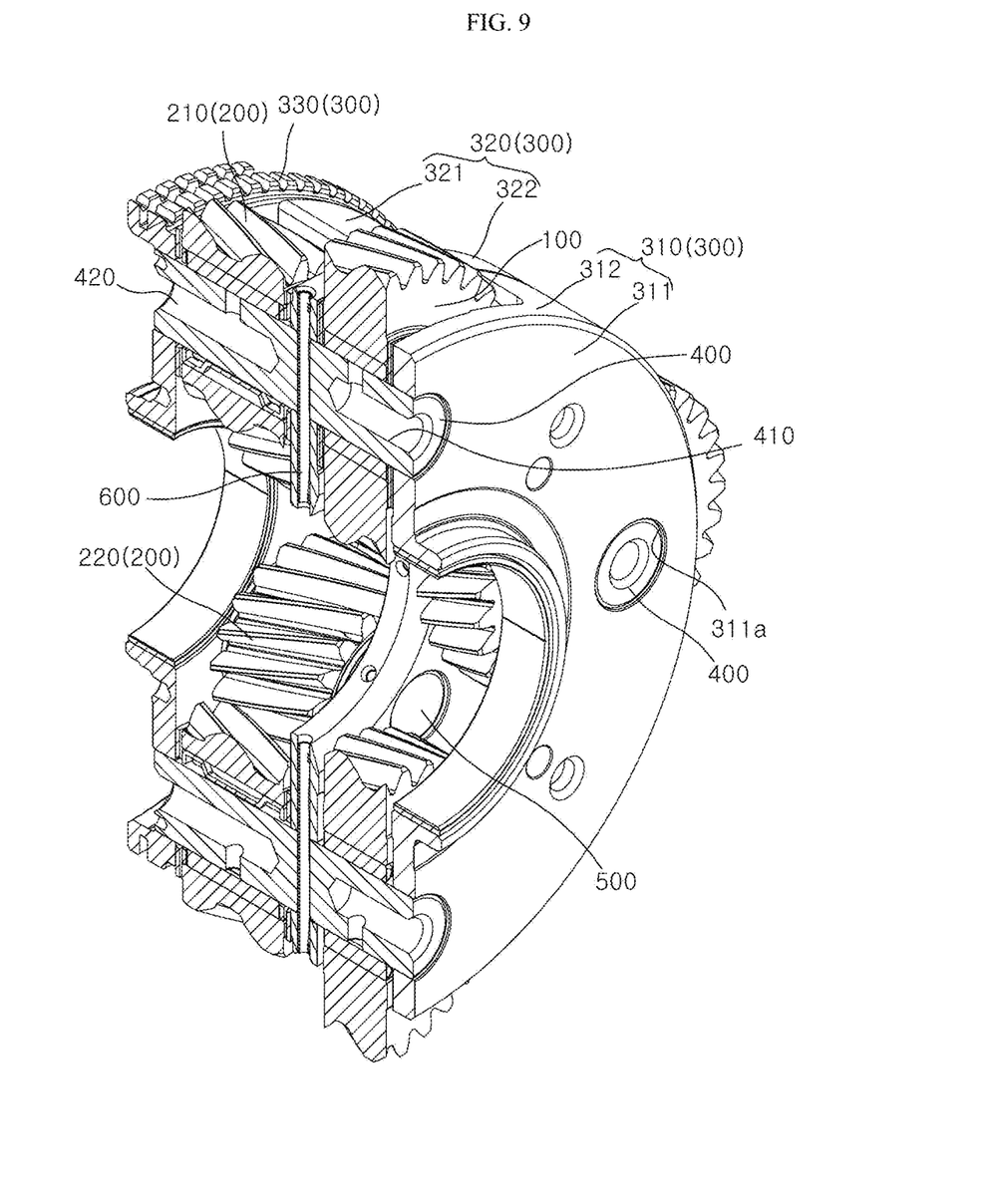
FIG. 9 is a perspective half sectional view of the planetary gear apparatus according to the embodiment of the present disclosure.

FIG. 1 is a perspective view schematically illustrating a planetary gear apparatus according to an embodiment of the present disclosure, FIG. 2 is an exploded perspective view of the planetary gear apparatus according to the embodiment of the present disclosure, FIG. 3 is a perspective view of the planetary gear apparatus according to the embodiment of the present disclosure, viewed from a different direction, FIG. 4 is a front view of the planetary gear apparatus according to the embodiment of the present disclosure, FIG. 5 is a cross-sectional view taken along the line A-A' in FIG. 4, FIG. 6 is a cross-sectional view taken along the line B-B' in FIG. 4, FIG. 7 is an enlarged view of the portion A in FIG. 6, FIG. 8 is an enlarged view of the portion B in FIG. 6, and FIG. 9 is a perspective half sectional view of the planetary gear apparatus according to the embodiment of the present disclosure.

Referring to FIGS. 1 to 4, a planetary gear apparatus 1 according to the embodiment of the present disclosure includes single pinion gears 100, double pinion gears 200, a planet carrier unit 300, first pinion shafts 400, and second pinion shafts 500. The single pinion gears 100 are a plurality of single pinion gears disposed within the carrier unit 300 so as to be spaced apart from each other in the circumferential direction.

The double pinion gears 200 include first double pinion gears 210 and second double pinion gears 220. The first double pinion gears 210 are a plurality of double pinion gears, and the second double pinion gears 220 are a plurality of double pinion gears. The first double pinion gears 210 and the second double pinion gears 220 are disposed within the planet carrier unit 300 so as to be spaced apart from each other in the circumferential direction. Here, the first double pinion gears 210 or the second double pinion gears 220 are located collinear with the single pinion gears 100.

The planet carrier unit 300 surrounds the single pinion gears 100, the first double pinion gears 210, and the second double pinion gears 220. The planet carrier unit 300 has a pair of space portions 340 and 350 disposed in parallel to each other in the axial direction. In one of the pair of space portions 340 and 350, the single pinion gears 100 are disposed to be spaced apart from each other in the circumferential direction. In the other of the pair of space portions 340 and 350, the first double pinion gears 210 and the second double pinion gears 220 are disposed to be spaced apart from each other in the circumferential direction. In this manner, the planet carrier unit 300 provides a space in which the single pinion gears 100, the first double pinion gears 210, and the second double pinion gears 220 may be accommodated.

The first pinion shafts 400 are coupled to the planet carrier unit 300. The single pinion gears 100 are rotatably mounted on the first pinion shafts 400. The first double pinion gears 210 or the second double pinion gears 220 are rotatably mounted on the first pinion shafts 400. As illustrated in FIG. 2, the first pinion shafts 400 are disposed to extend through the pair of space portions 340 and 350. The first pinion shafts 400 are a plurality of pinion shafts disposed on the planet carrier unit 300 so as to be spaced apart from each other in the circumferential direction. Here, the single pinion gears 100, the first double pinion gears 210, or the second double pinion gears 220 are mounted on the first pinion shafts 400, respectively, so as to be rotatable independently of each other.

The second pinion shafts 500 are coupled to the planet carrier unit 300. The first double pinion gears 210 or the second double pinion gears 220, except for those mounted on the first pinion shafts 400, are mounted on the second pinion shafts 500. The second pinion shafts 500 are disposed to extend through one of the pair of space portions 340 and 350. The plurality of second pinion shafts 500 are disposed on the planet carrier unit 300 so as to be spaced apart from each other in the circumferential direction. The first double pinion gears 210 or the second double pinion gears 220, except for those mounted on the first pinion shafts 400, are rotatably mounted on the second pinion shafts 500.

In an example, when the single pinion gears 100 and the first double pinion gears 210 are rotatably mounted on the first pinion shafts 400, the second double pinion gears 220 are rotatably mounted on the second pinion shafts 500. In another example, when the single pinion gears 100 and the second double pinion gears 220 are rotatably mounted on the first pinion shafts 400, the first double pinion gears 210 are rotatably mounted on the second pinion shafts 500.

As described above, in the planetary gear apparatus 1 according to the present disclosure, the single pinion gears 100, the first double pinion gears 210, or the second double pinion gears 220 are mounted on the first pinion shafts 400 so as to be rotatable independently of each other. Accordingly, the number of components may be reduced to reduce component costs, and the capacity of torque may be increased. Furthermore, the single pinion gears 100, the first double pinion gears 210, and the second double pinion gears 220 may be additionally disposed on the planet carrier unit 300 as required, thereby forming a reliable structure, by which the width of gear teeth may be reduced and noise may be reduced.

The planet carrier unit 300 includes a first carrier 310, a second carrier 320, and a third carrier 330. The first carrier 310 surrounds the single pinion gears 100 and includes first shaft hole portions 311a into which the first pinion shafts 400 are inserted. The first carrier 310 has the space portion 340 in which the single pinion gears 100 are accommodated. The first carrier 310 has the shape of a cylinder having one open side and includes a first carrier plate 311 and first carrier side plates 312. The first carrier plate 311 is a disk in which the first shaft hole portions 311a are formed to be spaced apart from each other at predetermined distances in the circumferential direction. The first carrier side plates 312 extend in one direction from circumferential portions of the first carrier plate 311 such that first open portions 312a are spaced apart from each other at predetermined distances. The first open portions 312a allow the gear teeth of the single pinion gears 100 to be exposed to the outside of the first carrier 310.

The second carrier 320 surrounds the first double pinion gears 210 and the second double pinion gears 220. The second carrier 320 includes second shaft hole portions 321a and third shaft hole portions 321b. The second shaft hole portions 321a face the first shaft hole portions 311a, and the first pinion shafts 400 are inserted into the second shaft hole portions 321a. The second pinion shafts 500 are inserted into the third shaft hole portions 321b (see FIGS. 5 to 9).

The second carrier 320 has the shape of a cylinder having one open side and includes a second carrier plate 321 and second carrier side plates 322. The second carrier 320 has the space portion 350 in which the first double pinion gears 210 and the second double pinion gears 220 are accommodated. The second carrier plate 321 is a disk in which the second shaft hole portions 321a are formed to be spaced apart from each other at predetermined distances in the circumferential direction and the third shaft hole portions 321b are formed to be spaced apart from each other at predetermined distances in the circumferential direction.

The second carrier side plates 322 extend in one direction from circumferential portions of the second carrier plate 321 such that first open portions 322a are spaced apart from each other at predetermined distances. The first open portions 322a allow the gear teeth of the first double pinion gears 210 or the second double pinion gears 220 to be exposed to the outside of the second carrier 320.

The third carrier 330 is disposed to face the second carrier 320. The third carrier 330 includes fourth shaft hole portions 331 and fifth shaft hole portions 332. The fourth shaft hole portions 331 face the first shaft hole portions 311a and the second shaft hole portions 321a, and the first pinion shafts 400 are inserted into the fourth shaft hole portions 331. The fifth shaft hole portions 332 face the third shaft hole portions 321b, and the second pinion shafts 500 are inserted into the fifth shaft hole portions 332. The third carrier 330 is a disk in which the fourth shaft hole portions 331 are formed to be spaced apart from each other at predetermined distances in the circumferential direction, and the fifth shaft hole portions 332 are formed to be spaced apart from each other at predetermined distances in the circumferential direction.

The first pinion shafts 400 respectively include a first oil hole portion 410 and a second oil hole portion 420. The first oil hole portions 410 allow oil to be supplied to the single pinion gears 100 therethrough. The second oil hole portions 420 allow oil to be supplied to the first double pinion gears 210 or the second double pinion gears 220 therethrough. Consequently, the oil may be properly supplied to the single pinion gears 100, the first double pinion gears 210, or the second double pinion gears 220.

The planetary gear apparatus 1 further includes carrier pins 600. The carrier pins 600 couple the first pinion shafts 400 to the second carrier 320 and the second pinion shafts 500 to the second carrier 320.

The second carrier 320 includes first carrier pin coupling hole portions 321c formed in directions intersecting the second shaft hole portions 321a such that the carrier pins 600 are coupled to the first carrier pin coupling hole portions 321c. The first pinion shafts 400 respectively include a second carrier pin coupling hole portion 430 (see FIG. 7). The second carrier pin coupling hole portions 430 face the first carrier pin coupling hole portions 321c, and the carrier pins 600 are coupled to the second carrier pin coupling hole portions 430. Specifically, the first carrier pin coupling hole portions 321c are formed in the second carrier 320 in directions orthogonal to the second shaft hole portions 321a, and the carrier pins 600 are inserted into the first carrier pin coupling hole portions 321c and the second carrier pin coupling hole portions 430, thereby coupling the first pinion shafts 400 and the second carrier 320.

The second carrier 320 has third carrier pin coupling hole portions 321d formed in directions intersecting the third shaft hole portions 321b such that the carrier pins 600 are coupled to the third carrier pin coupling hole portions 321d. The second pinion shafts 500 respectively have a fourth carrier pin coupling hole portion 520 (see FIG. 8). The fourth carrier pin coupling hole portion 520 face the third carrier pin coupling hole portions 321d, and the carrier pins 600 are coupled to the fourth carrier pin coupling hole portion 520. Specifically, the third carrier pin coupling hole portions 321d are formed in the second carrier 320 in directions orthogonal to the third shaft hole portions 321b, and the carrier pins 600 are inserted into the third carrier pin coupling hole portions 321d and the fourth carrier pin coupling hole portions 520, thereby coupling the second pinion shafts 500 and the second carrier 320. Consequently, the first pinion shafts 400 and the second pinion shafts 500 may be firmly coupled to the planet carrier unit 300.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:
1. A planetary gear apparatus comprising:
single pinion gears;

double pinion gears comprising first double pinion gears and second double pinion gears;
a planet carrier unit surrounding the single pinion gears, the first double pinion gears, and the second double pinion gears;
first pinion shafts coupled to the planet carrier unit, the single pinion gears being rotatably mounted on the first pinion shafts, and one of the first double pinion gears and the second double pinion gears being rotatably mounted on the first pinion shafts; and
second pinion shafts coupled to the planet carrier unit, wherein the other of the first double pinion gears and the second double pinion gears are mounted on the second pinion shafts,
wherein the planet carrier unit comprises:
a first carrier surrounding the single pinion gears;
a second carrier surrounding the first double pinion gears and the second double pinion gears; and
a third carrier disposed to face the second carrier, wherein the second carrier is disposed between the first carrier and the third carrier.

2. The planetary gear apparatus according to claim 1, wherein the single pinion gears, one of the first double pinion gears and the second double pinion gears are independently rotatable on the first pinion shafts.

3. A planetary gear apparatus comprising:
single pinion gears;
double pinion gears comprising first double pinion gears and second double pinion gears;
a planet carrier unit surrounding the single pinion gears, the first double pinion gears, and the second double pinion gears;
first pinion shafts coupled to the planet carrier unit, the single pinion gears being rotatably mounted on the first pinion shafts, and one of the first double pinion gears and the second double pinion gears being rotatably mounted on the first pinion shafts; and
second pinion shafts coupled to the planet carrier unit, wherein the other of the first double pinion gears and the second double pinion gears are mounted on the second pinion shafts,
wherein the planet carrier unit comprises:
a first carrier surrounding the single pinion gears and including first shaft hole portions into which the first pinion shafts are inserted;
a second carrier surrounding the first double pinion gears and the second double pinion gears and comprising second shaft hole portions into which the first pinion shafts are inserted and third shaft hole portions into which the second pinion shafts are inserted; and
a third carrier disposed to face the second carrier and comprising fourth shaft hole portions into which the first pinion shafts are inserted and fifth shaft hole portions into which the second pinion shafts are inserted.

4. The planetary gear apparatus according to claim 1, wherein the first pinion shafts comprise first oil hole portions and second oil hole portions, the first oil hole portions being configured to allow oil to be supplied to the single pinion gears therethrough, and the second oil hole portions being configured to allow the oil to be supplied to one of the first double pinion gears and the second double pinion gears therethrough.

5. The planetary gear apparatus according to claim 1, further comprising carrier pins coupling the first pinion shafts to the second carrier and the second pinion shafts to the second carrier.

6. The planetary gear apparatus according to claim 5, wherein the second carrier comprises first carrier pin coupling hole portions formed in directions intersecting the second shaft hole portions of the second carrier, the carrier pins being coupled to the first carrier pin coupling hole portions, and
wherein the first pinion shafts have second carrier pin coupling hole portions facing the first carrier pin coupling hole portions, the carrier pins being coupled to the second carrier pin coupling hole portions.

7. The planetary gear apparatus according to claim 6, wherein the second carrier has third carrier pin coupling hole portions formed in directions intersecting the third shaft hole portions of the third carrier, the carrier pins being coupled to the third carrier pin coupling hole portions, and
wherein the second pinion shafts have fourth carrier pin coupling hole portions facing the third carrier pin coupling hole portions, the carrier pins being coupled to the fourth carrier pin coupling hole portions.

8. The planetary gear apparatus according to claim 3, wherein the single pinion gears, one of the first double pinion gears and the second double pinion gears are independently rotatable on the first pinion shafts.

9. The planetary gear apparatus according to claim 3, wherein the first pinion shafts comprise first oil hole portions and second oil hole portions, the first oil hole portions being configured to allow oil to be supplied to the single pinion gears therethrough, and the second oil hole portions being configured to allow the oil to be supplied to one of the first double pinion gears and the second double pinion gears therethrough.

10. The planetary gear apparatus according to claim 3, further comprising carrier pins coupling the first pinion shafts to the second carrier and the second pinion shafts to the second carrier.

11. The planetary gear apparatus according to claim 10, wherein the second carrier comprises first carrier pin coupling hole portions formed in directions intersecting the second shaft hole portions, the carrier pins being coupled to the first carrier pin coupling hole portions, and
wherein the first pinion shafts have second carrier pin coupling hole portions facing the first carrier pin coupling hole portions, the carrier pins being coupled to the second carrier pin coupling hole portions.

12. The planetary gear apparatus according to claim 11, wherein the second carrier has third carrier pin coupling hole portions formed in directions intersecting the third shaft hole portions, the carrier pins being coupled to the third carrier pin coupling hole portions, and
wherein the second pinion shafts have fourth carrier pin coupling hole portions facing the third carrier pin coupling hole portions, the carrier pins being coupled to the fourth carrier pin coupling hole portions.

* * * * *